United States Patent
Seo et al.

(10) Patent No.: US 9,509,389 B2
(45) Date of Patent: Nov. 29, 2016

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Dong Youn Seo, Anyang-si (KR); Han Byul Seo, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 14/355,516

(22) PCT Filed: Nov. 1, 2012

(86) PCT No.: PCT/KR2012/009141
§ 371 (c)(1),
(2) Date: Apr. 30, 2014

(87) PCT Pub. No.: WO2013/066085
PCT Pub. Date: May 10, 2013

(65) Prior Publication Data
US 2015/0029964 A1 Jan. 29, 2015

Related U.S. Application Data

(60) Provisional application No. 61/554,471, filed on Nov. 1, 2011, provisional application No. 61/554,963, filed on Nov. 2, 2011, provisional application No. 61/594,383, filed on Feb. 3, 2012, provisional application No. 61/643,341, filed on May 6, 2012.

(51) Int. Cl.
*H04B 7/06* (2006.01)
*H04L 1/00* (2006.01)
*H04L 1/18* (2006.01)
*H04L 5/00* (2006.01)

(52) U.S. Cl.
CPC ........... *H04B 7/0626* (2013.01); *H04L 1/0027* (2013.01); *H04L 1/1861* (2013.01); *H04L 5/0053* (2013.01)

(58) Field of Classification Search
CPC .......................... H04L 1/0027; H04B 7/0626
See application file for complete search history.

(56) References Cited

U.S. PATENT DOCUMENTS

2012/0178494 A1* 7/2012 Haim ................. H04W 52/365
455/522
2013/0114554 A1* 5/2013 Yang .................... H04W 24/10
370/329

FOREIGN PATENT DOCUMENTS

| KR | 10-2010-0100644 A | 9/2010 |
| KR | 10-2011-0046288 A | 5/2011 |
| KR | 10-2011-0069741 A | 6/2011 |
| WO | 2011-085230 A2 | 7/2011 |
| WO | 2011-122911 A2 | 10/2011 |

* cited by examiner

*Primary Examiner* — Dang Ton
*Assistant Examiner* — Kevin Lee
(74) *Attorney, Agent, or Firm* — Dentons US LLP

(57) ABSTRACT

Disclosed are a method and an apparatus for transmitting channel state information (CSI) of a user equipment, which is allocated a plurality of serving cells, in a wireless communication system. The method comprises: receiving setting information for setting groups comprising at least one serving cell from the plurality of serving cells, and transmitting periodic CSI with respect to a group that is selected according to priority between the groups, when the periodic CSI with respect to each of the groups is set to be transmitted from the same subframe, wherein the periodic CSI with respect to each of at least two serving cells are transmitted together when the at least two serving cells are included in the group that is selected.

12 Claims, 11 Drawing Sheets

(b) MULTIPLE CCS (a) SINGLE CC

METHOD AND APPARATUS FOR TRANSMITTING CHANNEL STATE INFORMATION IN WIRELESS COMMUNICATION SYSTEM

This application is a 35 USC §371 National Stage entry of International Application No. PCT/KR2012/009141, filed Nov. 1, 2012, and claims priority to U.S. Provisional Application No. 61/643,341 filed May 6, 2012, 61/594,383 filed Feb. 3, 2012, 61/554,963 filed Nov. 2, 2011, and 61/554,471 filed Nov. 1, 2011, all of which are hereby incorporated by reference in their entirety.

BACKGROUND OF THE INVENTION

1. Field of the Invention

The present invention relates to wireless communication, and more particularly, to a method and apparatus for transmitting channel state information in a wireless communication system.

2. Related Art

One of the most important requirements of a next generation wireless communication system is to support a high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which allows separate bands to operate respective independent systems is satisfied, and a carrier aggregation (CA) is introduced. In concept, the CA aggregates a plurality of bands into one system. In this case, a band that can be independently managed is defined as a component carrier (CC).

The latest communication standard (e.g., 3GPP LTE-A or 802.16m) considers to expand its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a system supporting carrier aggregation is called a carrier aggregation system.

Meanwhile, in order to utilize a given channel capacity to the maximum extent possible, a wireless communication system regulates a modulation coding scheme (MCS) and a transmission power according to a given channel by using a link adaptation. In order to perform the link adaptation in a base station, there is a need to feed back channel state information of a user equipment.

According to the conventional technique, when a carrier aggregation system capable of allocating multiple carriers to the user equipment experiences a collision in which periodic channel state information for each of the multiple carriers is simultaneously transmitted in a specific subframe, only periodic channel state information for one carrier determined according to a priority is transmitted. In addition, when the periodic channel state information collides with transmission of acknowledgement/not-acknowledgement (ACK/NACK) for downlink data, the periodic channel state information is not transmitted but is dropped. Therefore, it is difficult to reliably perform periodic channel state reporting.

There is a need for channel state information transmission method and apparatus applicable to the carrier aggregation system.

SUMMARY OF THE INVENTION

The present invention provides a method and apparatus for transmitting channel state information in a wireless communication system.

According to an aspect of the present invention, a method of transmitting channel state information (CSI) of a user equipment to which a plurality of serving cells are allocated in a wireless communication system is provided. The method includes: receiving configuration information for configuring groups including at least one serving cell from the plurality of serving cells, and transmitting a periodic CSI for a group selected according to a priority between the groups, when a periodic CSI for each of the groups is configured to be transmitted in the same subframe, wherein a periodic CSI for each of at least two serving cells is transmitted together when the at least two serving cells are included in the selected group.

According to another aspect of the present invention, a method of transmitting a CSI of a user equipment to which a plurality of serving cells are allocated in a wireless communication system is provided. The method includes: generating a CSI for at least one serving cell among the plurality of serving cells; and transmitting the generated CSI through a physical uplink shared channel (PUSCH) which is an uplink data channel, wherein if the PUSCH does not have an uplink grant which is corresponding uplink scheduling information and is transmitted by using a resource predetermined by a higher layer signal, the CSI transmitted through the PUSCH is transmitted within a range of a predetermined upper limit.

According to another aspect of the present invention, there is provided a user equipment including: a radio frequency (RF) unit for transmitting and receiving a radio signal; and a processor operatively coupled to the RF unit, wherein the processor is configured for: receiving configuration information for configuring groups including at least one serving cell from the plurality of serving cells; and transmitting a periodic CSI for a group selected according to a priority between the groups, when a periodic CSI for each of the groups is configured to be transmitted in the same subframe, wherein a periodic CSI for each of at least two serving cells is transmitted together when the at least two serving cells are included in the selected group.

According to another aspect of the present invention, there is provided a user equipment including: an RF unit for transmitting and receiving a radio signal; and a processor operatively coupled to the RF unit, wherein the processor generates a CSI for at least one serving cell among the plurality of serving cells, and transmits the generated CSI through a PUSCH which is an uplink data channel, wherein if the PUSCH does not have an uplink grant which is corresponding uplink scheduling information and is transmitted by using a resource predetermined by a higher layer signal, the CSI transmitted through the PUSCH is transmitted within a range of a predetermined upper limit.

According to the present invention, multiple channel state information for a plurality of serving cells can be effectively transmitted. In addition, a radio resource can be effectively used also in transmission of channel state information through an uplink data channel independent of an uplink grant, and an influence exerted on uplink data can be minimized by a piggyback of the channel state information.

DESCRIPTION OF EXEMPLARY EMBODIMENTS

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advanced (LTE-A) is an evolution of the LTE. For clarity, the following description will focus on the 3GPP LTE/LTE-A. However, technical features of the present invention are not limited thereto.

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
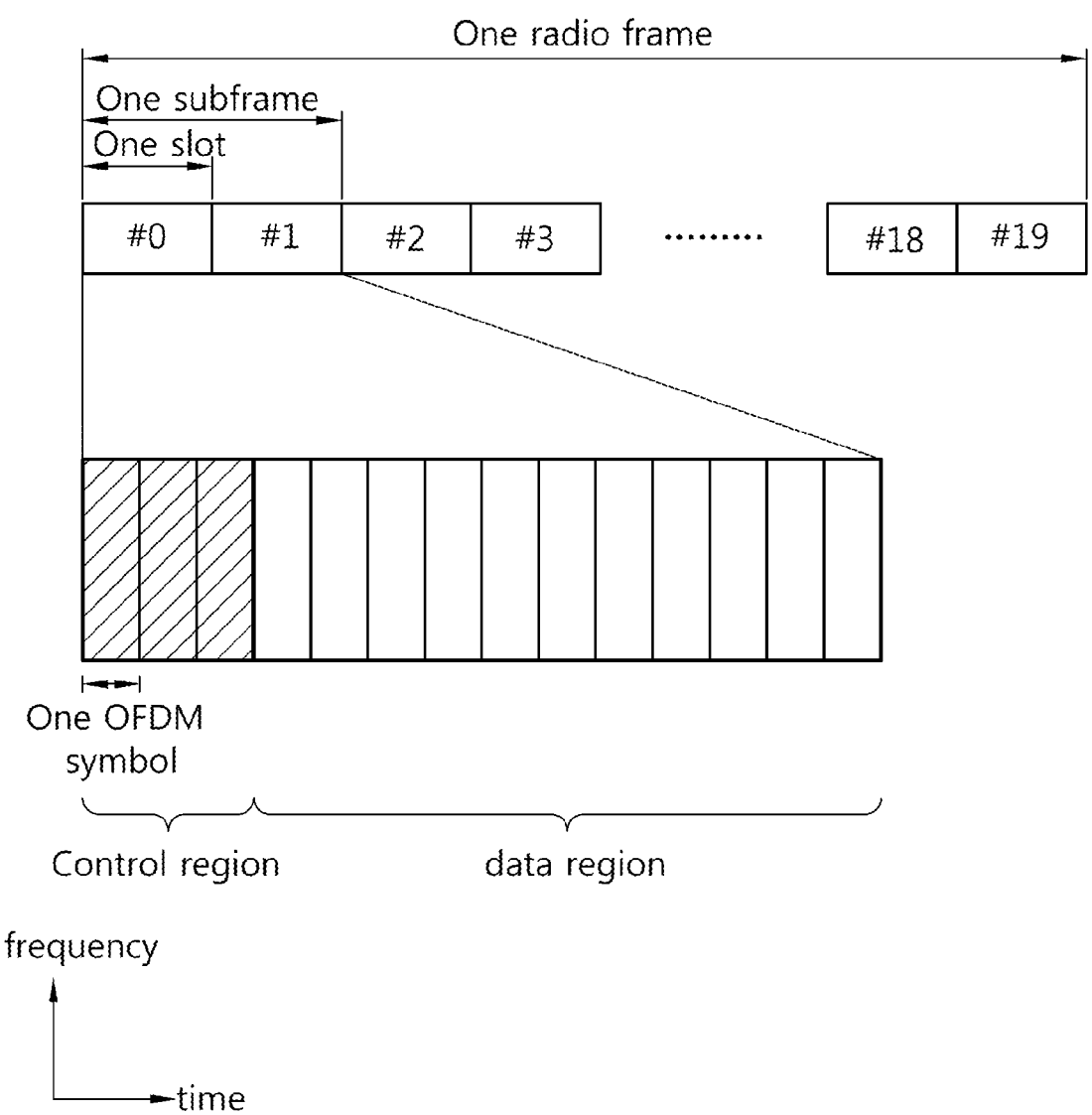
FIG. 1 shows a structure of a downlink radio frame in $3^{rd}$ generation partnership project (3GPP) LTE-advanced (LTE-A).

FIG. 1 shows a structure of a downlink radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

Figure 2:
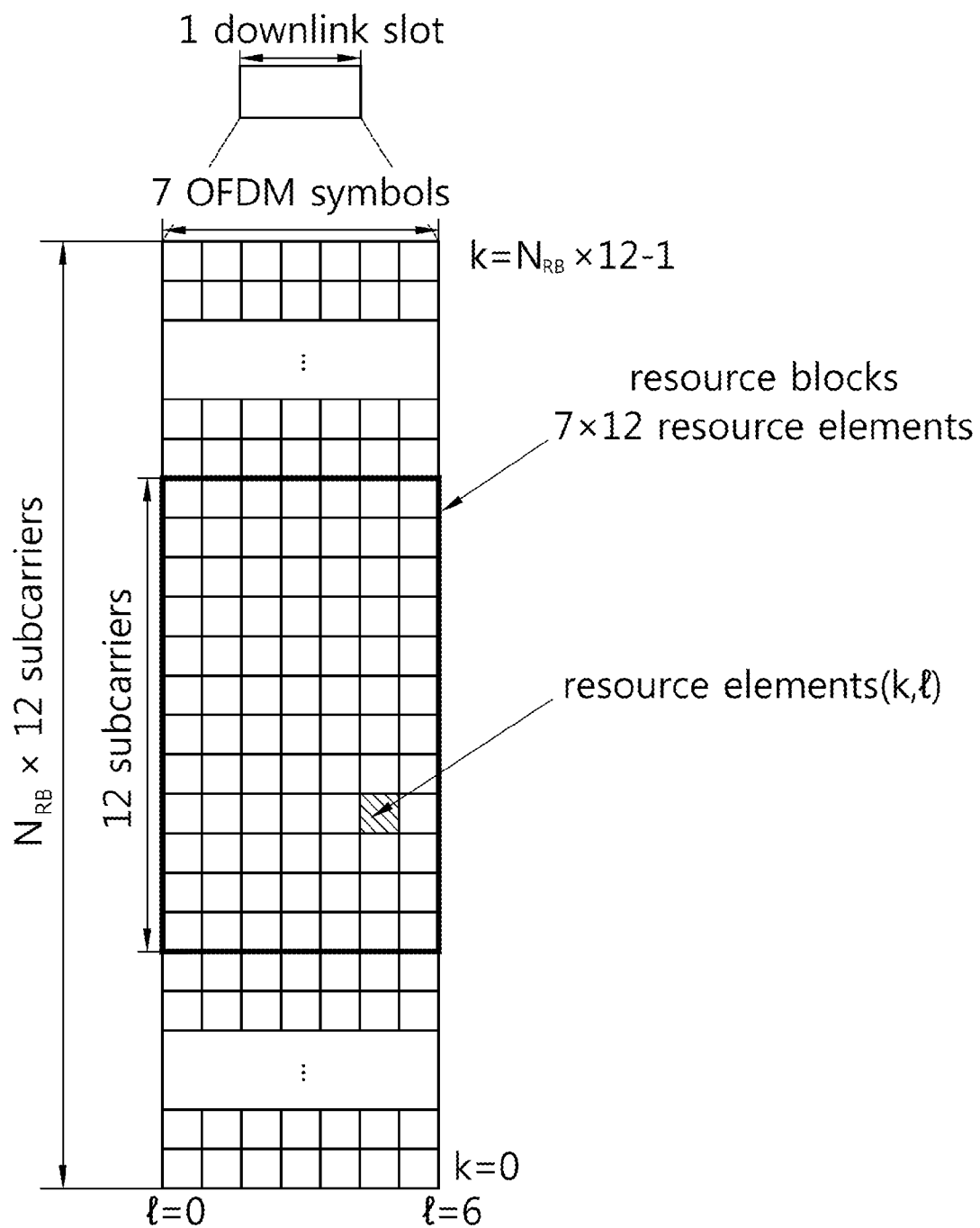
FIG. 2 shows an example of a resource grid for one downlink (DL) slot.

FIG. 2 shows an example of a resource grid for one DL slot.

Referring to FIG. 2, the DL slot includes a plurality of OFDM symbols in a time domain, and includes $N_{RB}$ resource blocks (RBs) in a frequency domain. The RB includes one slot in the time domain in a unit of resource allocation, and includes a plurality of consecutive subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, k (k=0, ... , $N_{RB}$×12−1) denotes a subcarrier index in the frequency domain, and l (l=0, ... , 6) denotes an OFDM symbol index in the time domain.

Although it is described in FIG. 2 that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc. The number of subcarriers in one OFDM symbol may be any one value selected from 128, 256, 512, 1024, 1536, and 2048.

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

A BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC. In a PDCCH for semi-persistent scheduling (SPS), an SPS-C-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data. Encoding includes channel encoding and rate matching. The coded data is modulated to generate modulation symbols. The modulation symbols are mapped to physical resource elements (REs).

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
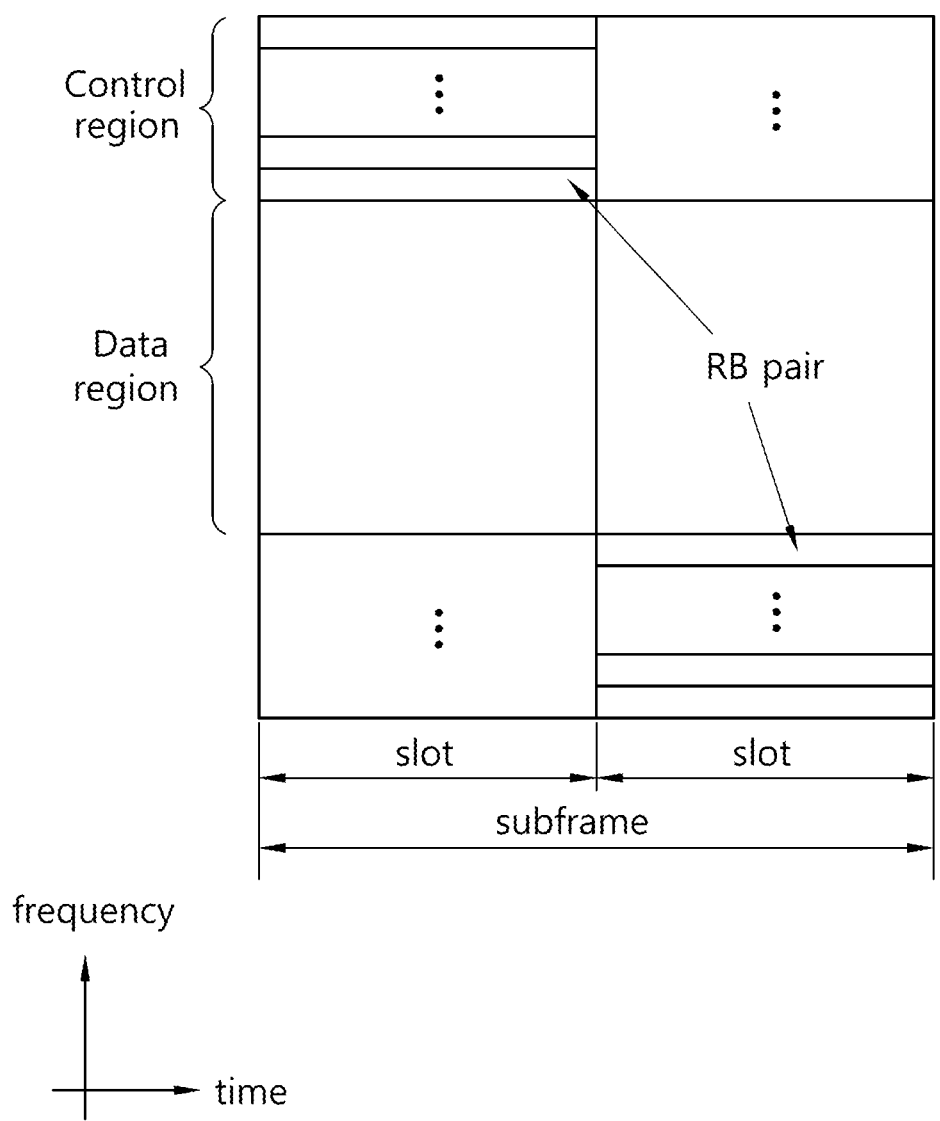
FIG. 3 shows a structure of an uplink (UL) subframe.

FIG. 3 shows a structure of a UL subframe.

Referring to FIG. 3, the UL subframe can be divided into a control region and a data region in a frequency domain. A physical uplink control channel (PUCCH) for transmitting UL control information is allocated to the control region. A physical uplink shared channel (PUSCH) for transmitting data (optionally, control information can be transmitted together) is allocated to the data region. According to a configuration, the UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI)) can be transmitted on the PUCCH.

The CQI provides information on a link-adaptive parameter that can be supported by the UE in a given time. The CQI may indicate a data rate that can be supported by a downlink channel by considering a UE receiver's property, signal to interference plus noise ratio (SINR), etc. The BS can use the CQI to determine a modulation (e.g., QPSK, 16-QAM, 64-QAM, etc.) and coding rate to be applied to the downlink channel. The CQI can be generated by using various methods. Examples of the methods include a method of feeding back the channel status by directly quantizing it, a method of feeding back the channel status by calculating an SINR, and a method of reporting a status actually applied to a channel, such as a modulation coding scheme (MCS). When the CQI is generated based on the MCS, the MCS includes a modulation scheme, a coding scheme, and a coding rate depending on the coding scheme.

The PMI provides information for a precoding matrix in precoding based on a codebook. The PMI is in association with multiple input multiple output (MIMO). When the PMI is fed back in MIMO, it is called closed-loop MIMO.

The RI is information regarding the number of layers recommended by the UE. That is, the RI indicates the number of independent streams used in spatial multiplexing. The RI is fed back only when it operates in a MIMO mode in which the UE uses spatial multiplexing. The RI is always in association with one or more CQI feedbacks. That is, a specific RI value is assumed in calculation of the CQI to be fed back. A rank of a channel changes slowly in general in comparison with the CQI, and thus the RI is fed back less frequently than the CQI. An RI transmission periodicity may be a multiple of a CQI/PMI transmission periodicity. The RI is given for a whole system band, and a frequency selective RI feedback is not supported.

A periodic CSI can be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing a CSI and a transport block for the UL-SCH. Examples of the CSI multiplexed to the data may include a CQI, a PMI, an RI, etc. Alternatively, the UL data may consist of only the CSI. The periodic or aperiodic CSI can be transmitted through the PUSCH.

Now, HARQ in 3GPP LTE will be described.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ period.

Figure 4:
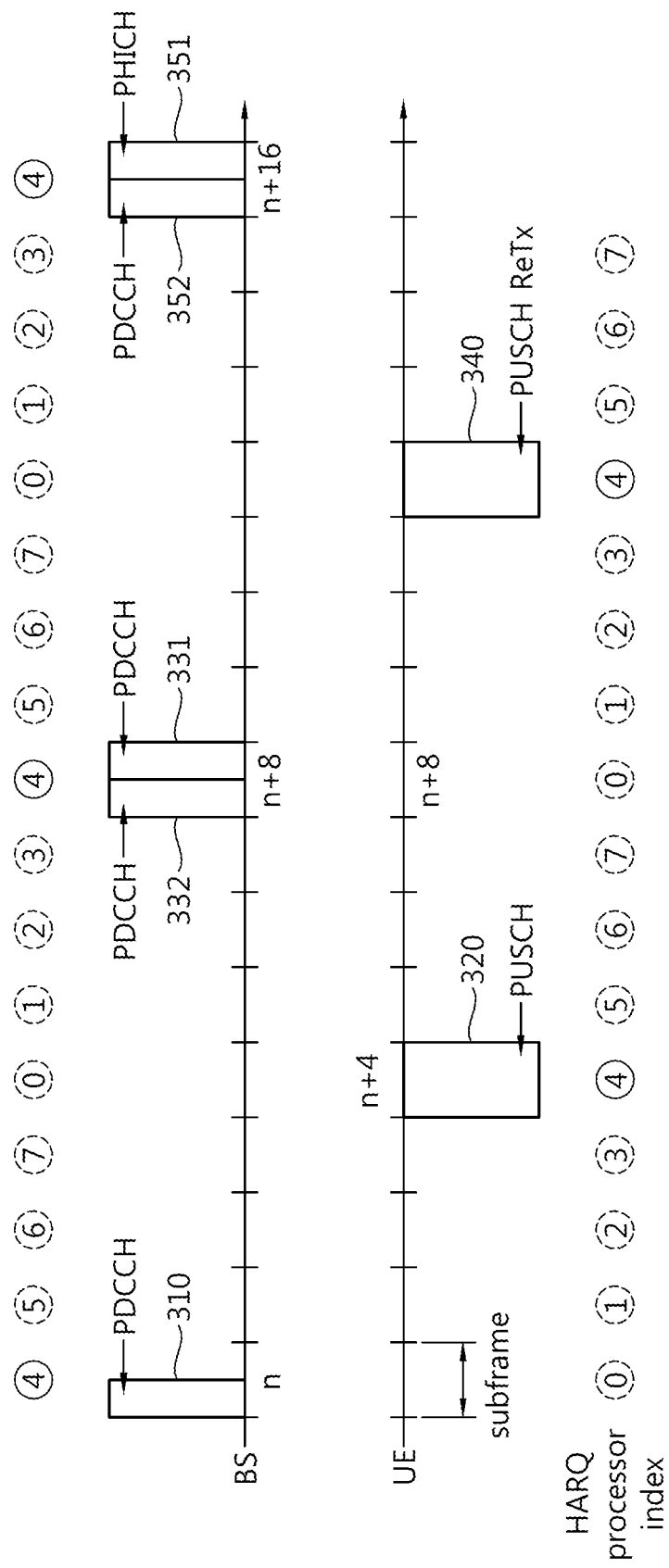
FIG. 4 shows UL synchronous hybrid automatic repeat request (HARQ) in 3GPP LTE.

FIG. 4 shows UL synchronous HARQ in 3GPP LTE.

A wireless device receives an initial UL grant on a PDCCH 310 from a BS in an $n^{th}$ subframe.

The wireless device transmits a UL transport block on a PUSCH 320 by using the initial UL grant in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant. Alternatively, retransmission of previous data may be suspended and a UL grant may be sent for transmission of new data. In case the ACK signal, the BS may send the UL grant for new transmission through the PDCCH. In addition, the BS may send the UL grant for retransmission (or retransmission UL grant). Upon receiving the retransmission UL grant, the wireless device ignores the ACK/NACK signal and follows an instruction of the retransmission UL grant. This is because the UL grant has higher reliability since the ACK/NACK signal does not have CRC and the UL grant has CRC.

When the UL grant is not received and the NACK signal is received, the wireless device sends a retransmission block on a PUSCH 340 in an $(n+12)^{th}$ subframe. For the transmission of the retransmission block, if the retransmission UL grant is received on the PDCCH 332, the wireless device uses the retransmission UL grant, and if the retransmission UL grant is not received, the wireless device uses the initial UL grant.

The BS sends an ACK/NACK signal for the UL transport block on a PHICH 351 in an $(n+16)^{th}$ subframe. When the ACK/NACK signal is the NACK signal, the BS may send a retransmission UL grant on a PDCCH 352, or may not send an additional UL grant.

After initial transmission is performed in the $(n+4)^{th}$ subframe, retransmission is performed in the $(n+12)^{th}$ subframe, and thus synchronous HARQ is performed with an HARQ period corresponding to 8 subframes.

Therefore, in frequency division duplex (FDD) of 3GPP LTE, 8 HARQ processes can be performed, and the respective HARQ processes are indexed from 0 to 7.

<Semi-Persistent Scheduling: SPS>

In the wireless communication system, the UE receives scheduling information such as a DL grant, a UL grant, etc., through the PDCCH, and performs an operation of receiving the PDSCH and transmitting the PUSCH on the basis of the scheduling information. In general, the DL grant and the PDSCH are received in the same subframe. In addition, in case of FDD, the PUSCH is transmitted four subframes later than a subframe in which the UL grant is received. In addition to such dynamic scheduling, LTE also provides semi-persistent scheduling (SPS).

In a DL or UL SPS, a higher-layer signal such as radio resource control (RRC) can be used to report to a UE about specific subframes in which semi-persistent transmission/ reception is performed. Examples of a parameter given as the higher layer signal may be a subframe period and an offset value.

The UE recognizes semi-persistent transmission through RRC signaling, and thereafter performs or releases SPS PDSCH reception or SPS PUCCH transmission upon receiving an activation or release signal of SPS transmission through a PDCCH. That is, in a case where the activation or release signal is received through the PDCCH instead of directly performing SPS transmission even if SPS scheduling is assigned through RRC signaling, SRS transmission and reception are performed in a subframe corresponding to an offset and a subframe period allocated through RRC signaling by applying a modulation and coding rate based on modulation coding scheme (MCS) information and a frequency resource (resource block) based on resource block allocation designated in the PDCCH. If an SPS release signal is received through the PDCCH, SPS transmission/reception is suspended. Upon receiving a PDCCH including the SPS activation signal, the suspended SPS transmission/reception is resumed by using an MCS and a frequency resource designated in the PDCCH.

The PDCCH for the SPS configuration/release can be called an SPS allocation PDCCH, and a PDCCH for a normal PUSCH can be called a dynamic PDCCH. The UE can validate whether the PDCCH is the SPS allocation PDCCH when the following conditions are satisfied, that is, 1) CRC parity bits derived from a PDCCH payload must be scrambled with an SPS C-RNTI, and 2) a value of a new data indicator field must be '0'. In addition, when each field value of a PDCCH is determined as shown in the field value of Table 4 below with respect to each DCI format, the UE recognizes DCI information of the PDCCH as SPS activation or release.

TABLE 1

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 1 above shows an example of a field value of an SPS allocation PDCCH for validating SPS activation.

TABLE 2

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |

TABLE 2-continued

| | DCI format 0 | DCI format 1A |
|---|---|---|
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1's |

Table 2 above shows an example of a field value of an SPS release PDCCH for validating SPS release.

<Carrier Aggregation>

Now, a carrier aggregation system will be described.

Figure 5:
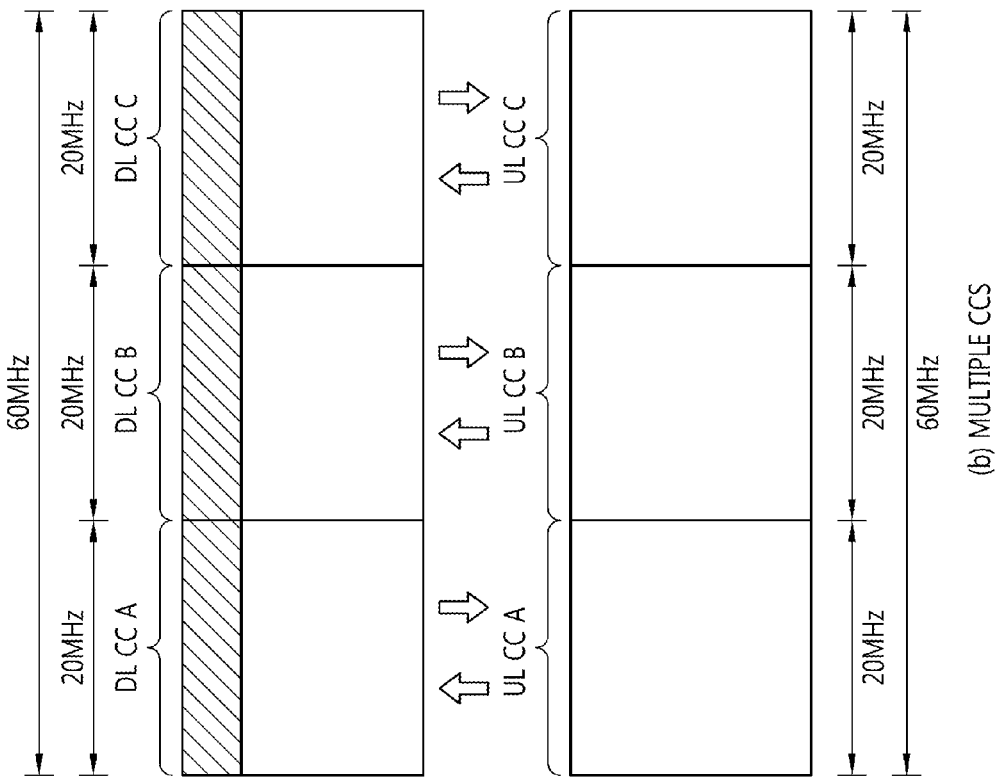
FIG. 5 shows an example of comparing a legacy single-carrier system and a carrier aggregation system.
Figure 5:
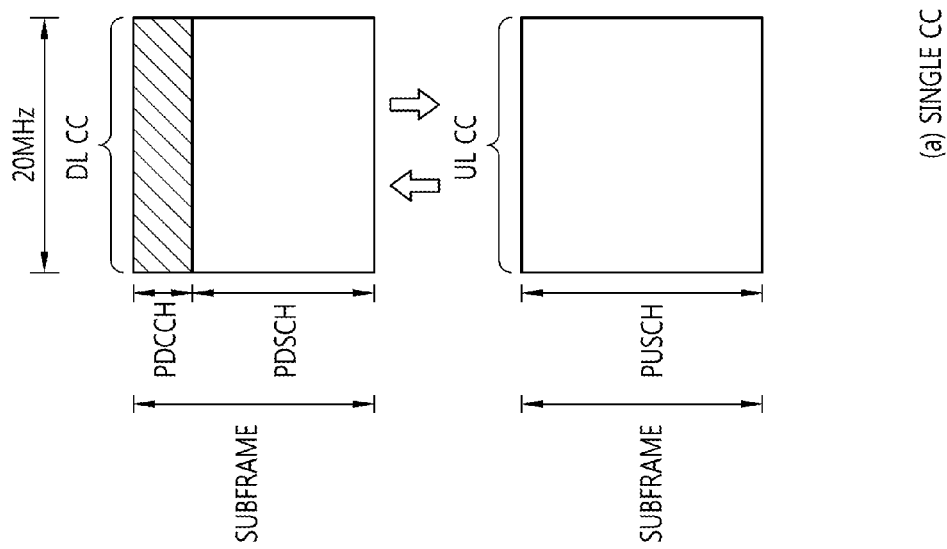

FIG. 5 shows an example of comparing a legacy single-carrier system and a carrier aggregation system.

Referring to FIG. 5, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. A CC implies a carrier used in a carrier aggregation system, and can be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. One serving cell may consist of one DL CC or a pair of {DL CC, UL CC}. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with a BS among several CCs. The PCC serves for a connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can be changed by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system can support a plurality of component carriers (CCs), that is, a plurality of serving cells, unlike a single-carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Figure 6:
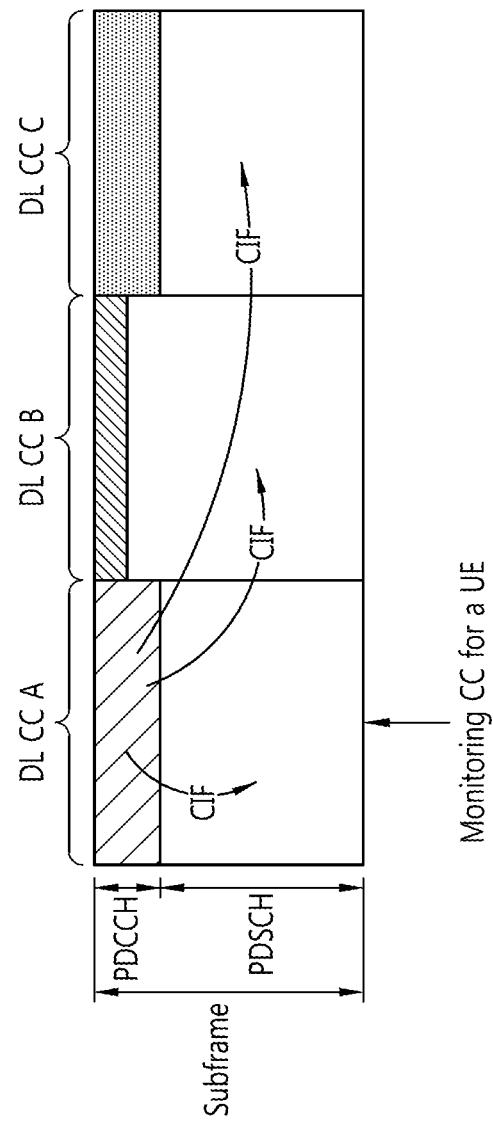
FIG. 6 shows an example of cross-carrier scheduling in a carrier aggregation system.

FIG. 6 shows an example of cross-carrier scheduling in a carrier aggregation system.

Referring to FIG. 6, a BS can configure a PDCCH monitoring DL CC set. The PDCCH monitoring DL CC set consists of some DL CCs among all aggregated DL CCs. When the cross-carrier scheduling is configured, a UE performs PDCCH monitoring/decoding only for a DL CC included in the PDCCH monitoring DL CC set. In other words, the BS transmits a PDCCH for a to-be-scheduled PDSCH/PUSCH only via a DL CC included in the PDCCL monitoring DL CC set. The PDCCH monitoring DL CC set can be determined in a UE-specific, UE group-specific, or cell-specific manner.

In the example of FIG. 6, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided.

Figure 7:
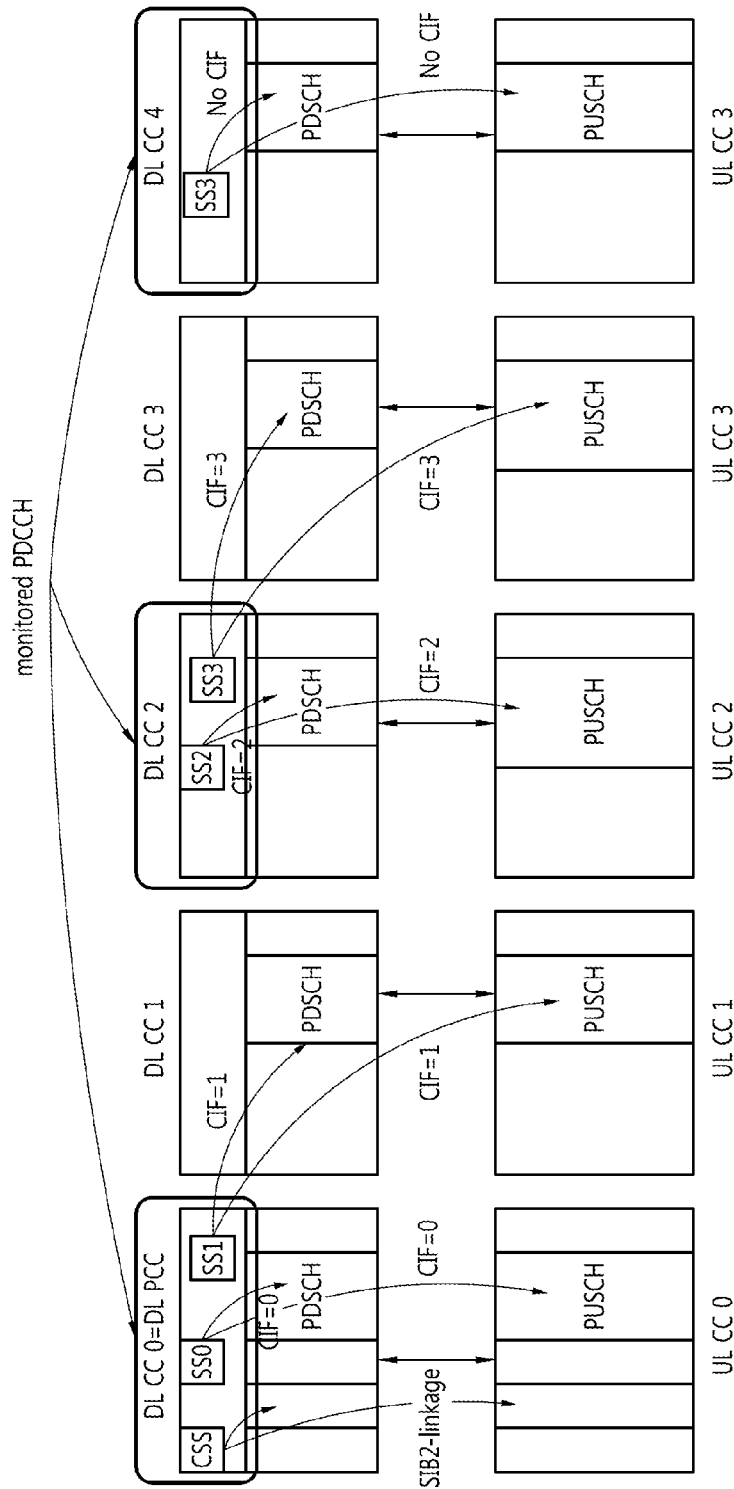
FIG. 7 shows an example of scheduling when cross-carrier scheduling is configured in a carrier aggregation system.

FIG. 7 shows an example of scheduling when cross-carrier scheduling is configured in a carrier aggregation system.

Referring to FIG. 7, a DL CC 0, a DL CC 2, and a DL CC 4 constitute a monitoring DL CC set. A UE searches for a DL grant/UL grant regarding the DL CC 0 and a UL CC 0 (i.e., a UL CC linked to the DL CC 0 by using an SIB2) in a CSS of the DL CC 0. Further, the UE searches for a DL grant/UL grant regarding a DL CC 1 and a UL CC 1 in an SS 1 of the DL CC 0. The SS 1 is an example of a USS. That is, the SS 1 of the DL CC 0 is a search space for searching for the DL grant/UL grant for performing cross-carrier scheduling.

[Method of Transmitting Channel State Information in Wireless Communication System]

In order to utilize a channel capacity given in a wireless communication system to the maximum extent possible, an MCS and a transmission power are regulated according to a given channel by using a link adaptation. In order to perform the link adaptation in a BS, there is a need to feed back channel status information of a UE.

1. Channel Status Information (CSI)

Channel information needs to be fed back for effective communication. In general, downlink channel information is transmitted through an uplink, and uplink channel information is transmitted through a downlink. Channel information indicating a channel status is called a CSI. Examples of the CSI include a precoding matrix index (PMI), a rank indicator (RI), a channel quality indicator (CQI), etc. The CSI may be generated by measuring data or a reference signal received by a UE. The reference signal may be various such as a cell specific reference signal (CRS) which is common in a cell, a channel state information reference signal (CSI-RS), a user equipment-specific reference signal (URS), etc.

2. Downlink Transmission Mode

A downlink transmission mode can be classified into 9 types described below.

Transmission mode 1: Single antenna port, port 0.
Transmission mode 2: Transmit diversity.
Transmission mode 3: Open loop spatial multiplexing: It is an open loop mode in which a rank adaptation based on RI feedback is possible. If a rank is 1, the transmit diversity may be applied. If a rank is greater than 1, a large delay CDD may be used.
Transmission mode 4: Closed loop spatial multiplexing or transmission diversity.
Transmission mode 5: Transmit diversity or multi-user MIMO.
Transmission mode 6: Transmit diversity or closed loop spatial multiplexing having single transmission layer.
Transmission mode 7: Single antenna port (port 0) is used when the number of PBCH antenna ports is 1, and otherwise, transmit diversity is used. Alternatively, single antenna port transmission (port 5) is performed.
Transmission mode 8: Single antenna port (port 0) is used when the number of PBCH antenna ports is 1, and otherwise, transmit diversity is used. Alternatively, dual layer transmission is performed using antenna ports 7 and 8, or single antenna port transmission is performed by using the port 7 or the port 8.
Transmission mode 9: Up to 8 layer transmission (ports 7 to 14).

In case of not an MBSFN subframe, if the number of PBCH antenna ports is 1, single antenna port transmission (port 0) is used, and otherwise transmit diversity is used.

In case of the MBSFN subframe, single antenna port transmission (port 7) is performed.

3. Periodic Transmission of CSI.

A CSI may be transmitted periodically through a PUCCH according to a period determined by a higher layer. A UE may be configured semi-statically by a higher layer signal so that a differential CSI (i.e., CQI, PMI, RI) is fed back periodically through the PUCCH. In this case, the UE transmits the CSI according to modes defined by the following table.

TABLE 3

| | | PMI Feedback Type | |
| --- | --- | --- | --- |
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

A periodic CSI reporting mode in the PUCCH is supported as follows with respect to each of the aforementioned transmission modes.

TABLE 4

| Transmission mode | PUCCH CSI reporting modes |
| --- | --- |
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 if PMI/RI reporting is set to UE; Modes 1-0, 2-0 if PMI/RI reporting is not set to UE |
| Transmission mode 9 | Modes 1-1, 2-1 if PMI/RI reporting is set to UE, and the number of CSI-RS ports is greater than 1; Modes 1-0, 2-0 if PMI/RI reporting is not set to UE or the number of CSI-RS ports is 1 |

Meanwhile, a collision of CSI reporting implies a case where a subframe configured to transmit a first CSI is the same as a subframe configured to transmit a second CSI. When the collision of CSI reporting occurs, the first CSI and the second CSI may be transmitted simultaneously, or according to a priority of the first CSI and the second CSI, a CSI having a higher priority may be transmitted while giving up (i.e., dropping) transmission of a CSI having a lower priority.

The CSI reporting through the PUCCH may have various reporting types as follows according to a transmission combination of CQI/PMI/RI, and supports a period and offset value classified for each reporting type (hereinafter, simply called a type).

Type 1: CQI feedback for subband selected by UE is supported.

Type 1a: Subband CQI and second PMI feedback is supported.

Type 2, 2b, 2c: Wideband CQI and PMI feedback is supported.

Type 2a: Wideband PMI feedback is supported.

Type 3: RI feedback is supported.

Type 4: Wideband CQI is transmitted.

Type 5: RI and wideband PMI feedback is supported.

Type 6: RI and PTI feedback is supported.

For each serving cell, a period $N_{pd}$ of a subframe unit and an offset $N_{offset,CQI}$ are determined for CQI/PMI reporting on the basis of a parameter 'cqi-pmi-ConfigIndex'($I_{CQI/PMI}$). In addition, for each serving cell, a period $M_{RI}$ and a relative offset $N_{offset,RI}$ are determined for RI reporting on the basis of a parameter 'ri-ConfigIndex'($I_m$). 'cqi-pmi-ConfigIndex' and 'ri-ConfigIndex' are configured by using a higher layer signal such as an RRC message. The relative offset $N_{offset,RI}$ for the RI has a value selected from a set $\{0, -1, \ldots, -N_{pd}-1\}$.

A subframe in which the UE reports the CSI is called a CSI subframe, and a CSI subframe set consisting of a plurality of CSI subframes may be configured to the UE. If reporting is configured to the UE in two or more CSI subframe sets, 'cqi-pmi-ConfigIndex' and 'ri-ConfigIndex' corresponding to each CSI subframe set are given. For example, if CSI reporting is configured in two CSI subframe sets, 'cqi-pmi-ConfigIndex' and 'ri-ConfigIndex' are for a first CSI subframe set, and 'cqi-pmi-ConfigIndex2' and 'ri-ConfigIndex2' are for a second CSI subframe set.

If CSI reporting of a CSI type 3, 5, or 6 for one serving cell collides with CSI reporting of a CSI type 1, 1a, 2, 2a, 2b, 2c, or 4 for the one serving cell, the CSI reporting of the CSI type 1, 1a, 2, 2a, 2b, 2c, or 4 has a lower priority and thus is dropped.

If two or more serving cells are configured to the UE, the UE performs only CSI reporting for only one serving cell in a given subframe. In the given subframe, the CSI reporting of the CSI type 3, 5, 6, or 2a of a first cell may collide with the CSI reporting of the CSI type 1, 1a, 2, 2b, 2c, or 4 of a second cell. In this case, the CSI reporting of the CSI type 1, 1a, 2, 2b, 2c, or 4 has a lower priority and thus is dropped.

In a given subframe, the CSI reporting of the CSI type 2, 2b, 2c, or 4 of the first cell may collide with the CSI reporting of the type 1 or 1a of the second cell. In this case, the CSI reporting of the CSI type 1 or 1a has a lower priority and thus is dropped. The first cell and the second cell are different from each other.

In a given subframe, CSI reporting of a CSI type having the same priority of different serving cells may collide. In this case, a CSI of a serving cell having a lowest serving cell index ServCellIndex is reported, and CSIs of all other serving cells are dropped.

4. Aperiodic Transmission of CSI

A PUSCH scheduling control signal transmitted through a PDCCH, that is, a UL grant, may include a control signal for requesting transmission of a CSI, that is, an aperiodic CSI request signal. In this case, a UE aperiodically reports the CSI through the PUSCH.

1) Transmission of CQI/PMI/RI Through PUSCH after Receiving CQI Transmission Request Signal (i.e., CQI Request).

In this case, a control signal (i.e., CQI request) for requesting transmission of a CQI is included in a PUSCH scheduling control signal (i.e., UL grant) transmitted through a PDCCH. Table 5 below shows a mode when CQI/PMI/RI are transmitted through the PUSCH.

TABLE 5

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The transmission mode of Table 5 may be indicated by a higher layer signal transmitted by the BS, and CQI/PMI/RI may be all transmitted through a PUSCH of the same subframe. The mode 2-1, mode 2-0, mode 2-2, mode 3-0, and mode 3-1 of Table 5 are described below.

1-1) Mode 1-2

A precoding matrix is selected under the assumption that data is transmitted for each subband only through a corresponding subband. A UE generates a CQI by assuming a selected precoding matrix as to a system band or a whole band (called a band set S) designated by a higher layer signal.

The UE transmits the CQI and a PMI value of each subband. In this case, a size of each subband may vary depending on a size of the system band.

1-2) Mode 2-0

A UE selects preferred M subbands as to a system band or a band (i.e., a band set S) designated by a higher layer signal. The UE generates one CQI value under the assumption that data is transmitted in the selected M subbands. The UE additionally generates one CQI (i.e., wideband CQI) as to the system band or the band set S.

When a plurality of codewords are present for the selected M subbands, a CQI value for each codeword is defined in a differential form. Differential CQI=Index corresponding to CQI value for selected M subbands−wideband CQI index The UE transmits information regarding a location of the selected M subbands, one CQI value for the selected M subbands, and a CQI value generated for a system band of a band set S. In this case, a subband size and a value M may vary depending on a size of the system band.

1-3) Mode 2-2

A UE selects a location of M preferred subbands and a single precoding matrix for the M preferred subbands simultaneously under the assumption that data is transmitted through M preferred subbands.

A CQI value for the M preferred subbands is defined for each codeword. The UE additionally generates a wideband CQI value as to the system band or the band set S.

The UE transmits information regarding the location of the M preferred subbands, one CQI value for the selected M subbands, a single precoding matrix index (PMI) for the M preferred subbands, a wideband precoding matrix index, and a wideband CQI value. In this case, the subband size and the value M may vary depending on the size of the system band.

1-4) Mode 3-0

A UE generates a wideband CQI value. The UE generates a CQI value for each subband under the assumption that data is transmitted through each subband. In this case, even if RI>1, the CQI value indicates only a CQI value for a first codeword.

1-5) Mode 3-1

A single precoding matrix is generated for a system band or a band set S. A UE generates a CQI for a subband per codeword by assuming a single precoding matrix generated previously as to each subband. The UE may generate a wideband CQI by assuming the single precoding matrix.

A CQI value of each subband is expressed in a differential form. That is, it can be obtained by 'Subband CQI=Subband CQI index−Wideband CQI index'. A subband size may vary depending on a size of a system band.

Now, the present invention will be described.

In LTE release 10, a plurality of serving cells may be allocated to a UE. In this case, in order for the UE to be able to report channel state information (i.e., CSI) for a downlink channel state for each serving cell, a BS can independently determine a periodic CSI reporting mode (simply called a CSI reporting mode) for each serving cell, a period of periodic CSI reporting (simply called a CSI reporting period), etc.

A plurality of CSI types may be configured in the same UL subframe, which is expressed as a CSI collision. When the CSI collision occurs, only one CSI type may be transmitted according to a priority and the remaining CSI types may be dropped. Although the priority applied when the CSI collision occurs has already been described, it will be described again for convenience of explanation.

<Priority of CSI for the Same Cell>

If CSI reporting of a CSI type 3, 5, or 6 collides with CSI reporting of a CSI type 1, 1a, 2, 2b, 2c, or 4 with respect to one serving cell, the CSI reporting of the type 1, 1a, 2, 2b, 2c, or 4 has a lower priority and thus is dropped.

In case of the remaining CSI types other than the RI series (i.e., the CSI types 3, 5, and 6), transmission is performed with an interval which is a multiple of $N_{pd}$, whereas the RI series are configured separately in a subframe which is not a multiple of $N_{pd}$ by using $N_{offset,RI}$. If $N_{offset,RI}=0$, different CSI types may collide, and thus when the collision occurs, a CSI type having a lower priority than the RI series is dropped.

<Priority of CSI for Different Cells>

First rule: If two or more serving cells are configured to the UE, the UE performs only CSI reporting for only one serving cell in a given subframe. In the given subframe, the CSI reporting of the CSI type 3, 5, 6, or 2a of a first cell may collide with the CSI reporting of the CSI type 1, 1a, 2, 2b, 2c, or 4 of a second cell. In this case, the CSI reporting of the CSI type 1, 1a, 2, 2b, 2c, or 4 has a lower priority and thus is dropped.

In a given subframe, the CSI reporting of the CSI type 2, 2b, 2c, or 4 of the first cell may collide with the CSI reporting of the type 1 or 1a of the second cell. In this case, the CSI reporting of the CSI type 1 or 1a has a lower priority and thus is dropped. The first cell and the second cell are different from each other.

Second rule: CSI reporting of a CSI type having the same priority of different serving cells may collide in a give subframe. In this case, a CSI of a serving cell having a lowest serving cell index ServCellIndex is reported, and CSIs of all other serving cells is dropped.

According to such a conventional technique, when CSI periods of a plurality of serving cells collide, the UE selects and transmits only one CSI for one serving cell, and drops the remaining CSIs. In accordance with another rule in which a periodic CSI is dropped when UL ACK/NACK transmission for a PDSCH collides with periodic CSI transmission, the conventional technique decreases an effect of periodic CSI reporting and causes a loss of a system throughput. In particular, such a problem may become more serious in a TDD system in which the number of UL subframes is limited.

Accordingly, it is considered in a future wireless communication system that, when CSI transmission of a plurality of serving cells collides in one UL subframe, CSIs for the plurality of serving cells are simultaneously transmitted. Hereinafter, periodic CSIs for the plurality of serving cells are called multiple CSIs (mCSI), and a periodic CSI for one serving cell is called a single CSI.

Periodic reporting of the mCSI may be transmitted through a PUCCH or a PUSCH.

Figure 8:
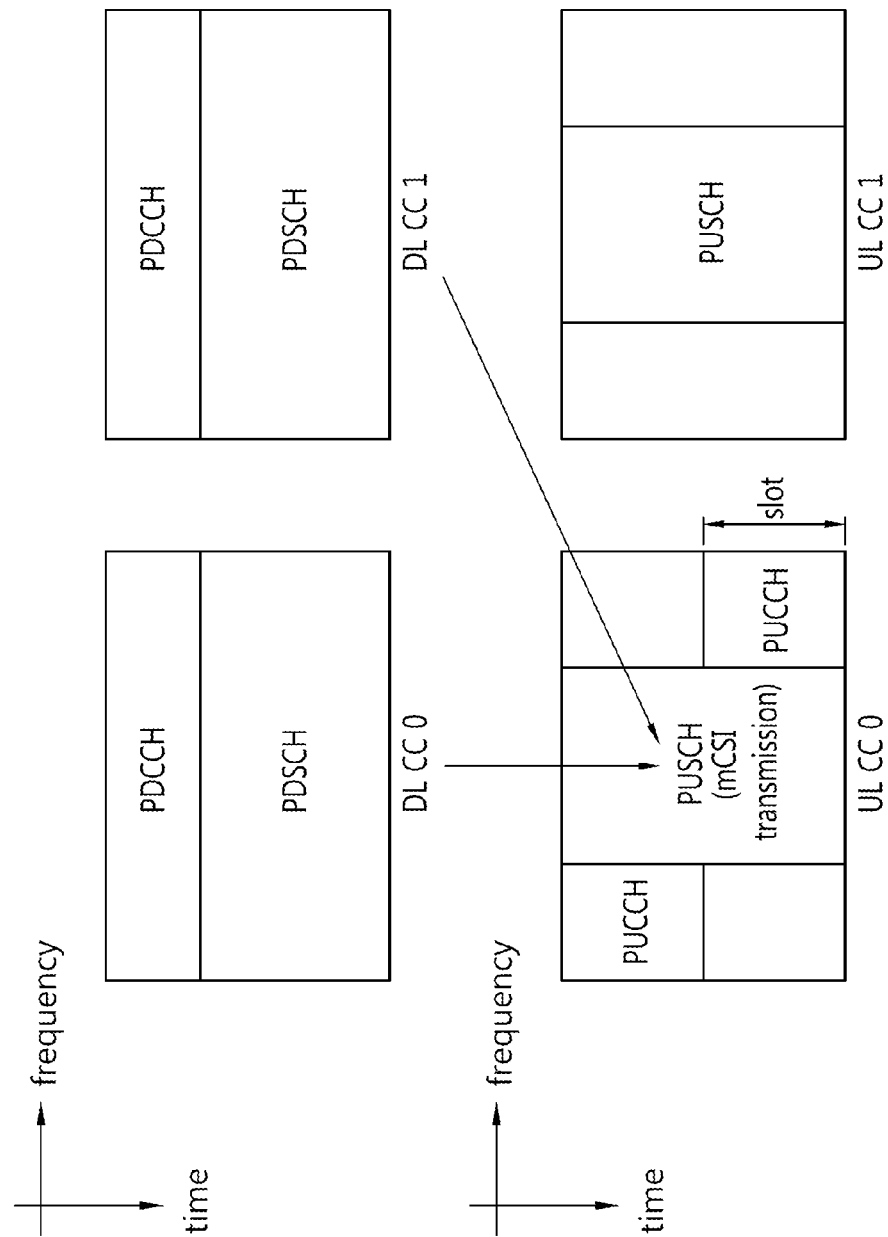
FIG. 8 shows an example of a method for periodically reporting multiple channel state information (CSI).

FIG. 8 shows an example of a method for periodically reporting multiple CSIs.

Referring to FIG. 8, DL CCs 0 and 1 and UL CCs 0 and 1 may be set to a UE. The DL CC 0 and the UL CC 0 may be a primary cell, and the DL CC 1 and the UL DD 1 may be a secondary cell.

A BS may indicate a transmission period of a periodic CSI and a cell for transmitting the periodic CSI by using an RRC message with respect to each cell. For example, it may be configured that the periodic CSI is transmitted through a PUSCH of the UL CC 0. If periodic CSIs for the DL CCs 0 and 1 collide in a specific UL subframe, the UE my transmit all of the periodic CSI (indicated by mCSI) for the DL CC 0 and the periodic CSI for the DL CC 1 through a PUSCH of the specific UL subframe. Although an example of transmitting the mCSI through the PUSCH is shown in FIG. 8, the multiple CSIs may be transmitted through the PUCCH as described above.

The multiple CSIs may be all transmitted in one subframe unlike a case where each CSI information is transmitted by being segmented in a subframe according to a period in a periodic PUCCH CSI mode. For example, CQI, RI, PMI, etc., for each DL CC may be all transmitted in the same subframe without being transmitted in different subframes.

Meanwhile, PUSCH transmission may be classified into transmission based on dynamic scheduling and other transmissions. The PUSCH transmission based on the dynamic scheduling may be, for example, PUSCCH transmission scheduled by a UL grant, first PUSCH transmission scheduled by semi-persistent scheduling (SPS) activation/reactivation PDCCH, etc. Although the PUSCH transmission scheduled by the UL grant is described hereinafter as an example of dynamic scheduling, the present invention is not limited thereto, and thus the first PUSCH transmission scheduled by the SPS activation PDCCH is also included in the present invention. In addition, the PUSCH scheduled by the UL grant is simply called a PUSCH with a UL grant.

A PUSCH not based on the dynamic scheduling may be transmitted in a case where a PUSCH resource is allocated and transmitted semi-statically without a UL grant similarly to SPS, a case where a periodic PUSCH is transmitted by designating a PUSCH resource with RRC, a case where a PUSCH is retransmitted based on a PHICH response (NACK) without a UL grant, etc. Hereinafter, such a PUSCH is called a PUSCH without a UL grant. The first PUSCH transmission scheduled by the SPS activation/reactivate PDCCH is PUSCH transmission based on dynamic scheduling, but after the SPS activation/reactivation, PUSCH transmission without a UL grant is performed starting from second PUSCH transmission.

In case of performing the PUSCH transmission with the UL grant, a PUSCH is scheduled through the UL grant according to the number of periodic CSIs in which transmission timing overlaps in a corresponding UL subframe. However, in case of performing the PUSCH transmission without the UL grant, the number of periodic CSIs which collide in a PUSCH in an initial resource allocation may differ from the number of periodic CSIs which collide in a subsequent PUSCH. Then, a resource of the PUSCH may be insufficient or may be wasted, which may cause a case where a desired data decoding performance cannot be expected.

Hereinafter, a method of solving such a problem is described. In addition, a method of effectively transmitting multiple CSIs is described. For convenience of explanation, a reporting target of the multiple CSIs is indicated by a DL CC, but the present invention is not limited thereto. That is, the reporting target of the multiple CSIs is not limited to the DL CC, and thus all other targets which show different channel property and thus must perform different reporting may also be included. For example, it may be a plurality of transmission modes (also called points) in cooperative communication, which can be distinguished by giving different CSI processes for CSI measurement. The CSI process may be configured with one or more CSI-RSs and interference measurement resources (IMRs).

DL CCs which are the targets of the multiple CSIs transmitted through the PUSCH with the UL grant or through the PUCCH may be all activated DL CCs in which a periodic CSI reporting mode is set.

Alternatively, a BS may group the DL CCs by using an RRC message. The DL CCs grouped by using the RRC message are called a DL CC group. The DL CC group is not necessarily configured with a plurality of DL CCs, and thus may be configured with one DL CC. That is, the DL CC group includes at least one DL CC. For the DL CC group including the plurality of DL CCs, the UE may transmit multiple CSIs. That is, the DL CCs which are the targets of the multiple CSIs may be activated DL CCs which are configured by the BS by using the RRC message.

The BS may explicitly indicate DL CCs included in a DL CC group by using a cell index. Alternative, the DL CCs may also be implicitly indicated in such a manner that periodic CSI transmission periods for DL CCs in the same DL CC group are all identical or have a multiple relation with each other. In this case, different DL CC groups may have different periodic CSI transmission periods. That is, each DL CC group may be distinguished in terms of a periodic CSI transmission period.

Meanwhile, a configuration of a period of RI series may be designated separately from a period of different CSI information (e.g., CQI). If the DL CC does not have a CSI of the RI series, the configuration of the period of the RI series may be ignored.

Figure 9:
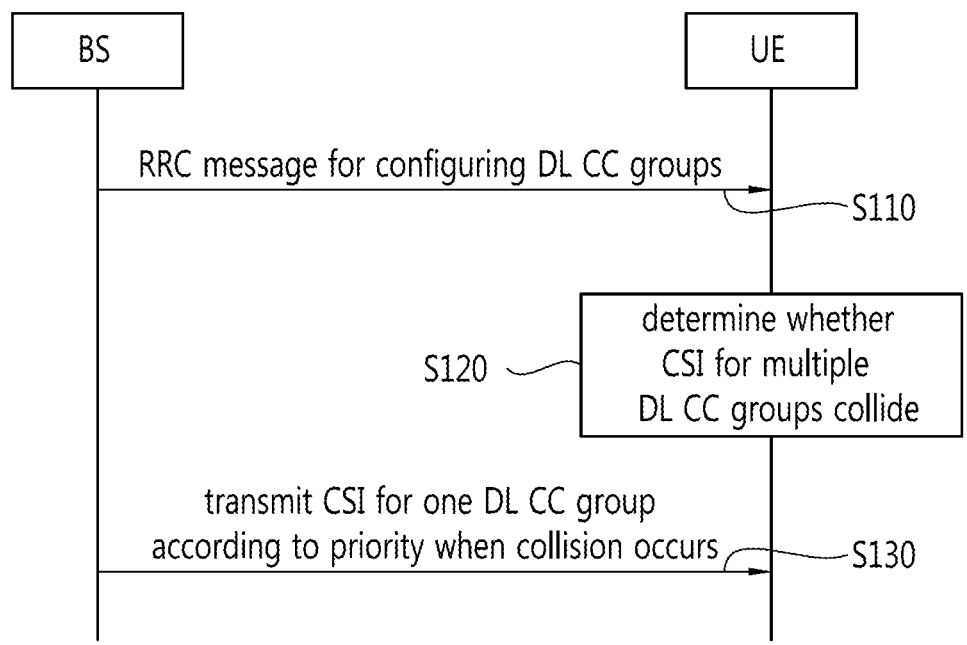
FIG. 9 shows an example of a CSI transmission method according to an embodiment of the present invention.

FIG. 9 shows an example of a CSI transmission method according to an embodiment of the present invention.

Referring to FIG. 9, a BS transmits an RRC message for configuring DL CC groups to a UE (step S110). DL CCs in the DL CC group may have the same periodic CSI transmission period.

The UE determines whether CSIs of a plurality of DL CC groups collide (step S120), and if the collision occurs, transmits a CSI for one DL CC group according to a priority (step S130).

That is, if the CSI periods collide among the DL CC groups, only one DL CC group may be selectively transmitted and the remaining DL CC groups may be dropped according to the priority. For example, a DL CC group including a DL PCC may have a higher priority than other DL CC groups.

Alternatively, among the DL CC groups, if a periodic CSI for a first DL CC group including only one DL CC collides with multiple CSIs for a second DL CC group including a plurality of DL CCs, a periodic DSI for the first DL CC group may be dropped.

If there is a limitation of a payload in a channel or format used to transmit the periodic CSI, the method described with reference to FIG. 9 is available. For example, a PUCCH format 3 may be used to transmit information bits consisting of up to 22 bits. In addition, a maximum information bit of the periodic DSI for one cell is 11 bits. Therefore, by using a PUCCH format 3, the periodic CSI can be transmitted for up to two cells.

It is assumed a case where two DL CCs are included in each of the DL CC groups 1 and 2, and multiple CSIs for the DL CC group 1 and multiple CSIs for the DL CC group 2 are transmitted. When the multiple CSIs for the DL CC group 1 and the multiple CSIs for the DL CC group 2 are configured to be transmitted through a PUCCH of the same UL subframe, for example, the UE may drop the multiple CSIs for the DL CC group 1 and may transmit only the multiple CSIs for the DL CC group 2. By transmitting only the multiple CSIs for the DL CC group 2 through the PUCCH instead of transmitting the multiple CSIs for the DL CC group 1 through the PUSCH, a single carrier priority can be maintained, and an amplifier of the UE can be effectively configured.

If a CSI for a DL CC group is configured to be transmitted through a piggyback on a PUSCH, an amount of a payload of the CSI for the DL CC group may be limited to decrease an influence exerted on data, and only a specific CSI for the DL CC group may be transmitted by being selected according to the limited payload amount. For example, only RI series (RI/PTI, etc.) for the DL CC group may be selected and transmitted.

In addition, in order to decrease a change in an amount of payload transmitted at each time of transmitting a CSI, a CSI transmission time between cells may be regulated. For example, on the contrary, if a wideband CSI of a first cell and a subband CSI of a second cell are transmitted in a first UL subframe, a subband CSI of the first cell and a wideband CSI of the second cell may be transmitted in a second UL subframe.

In addition, the BS may configure a separate SPS for each DL CC group.

According to the conventional technique, a UE to which a plurality of serving cells are configured transmits a periodic CSI of each serving cell through a PUCCH of a primary cell. In this case, only a periodic CSI for only one serving cell is reported according to a priority in a subframe including the PUCCH.

On the other hand, in the present invention, multiple CSIs can be transmitted through a PUCCH or a PUSCH. The BS may group and designate in advance serving cells capable of transmitting the multiple CSIs, and the UE may transmit the multiple CSIs in accordance therewith. Since the BS can designate serving cells which require a periodic CSI according to a channel state and the multiple CSIs for the serving cells can be simultaneously fed back, a system performance is improved in comparison with the conventional technique. In particular, if a cooperative multi-point (CoMP) is used, the BS needs to simultaneously receive CSIs for DL CCs of points participating in cooperative transmission. In this case, the BS may apply the present invention by determining DL CCs of the points participating in the cooperative transmission to a DL CC group.

Hereinafter, a case where multiple CSIs are transmitted through a PUSCH will be described in a greater detail. The multiple CSIs may be transmitted through the PUSCH by being piggybacked together with data, or may be transmitted alone through the PUSCH.

CSI reporting periods for DL CCs which are targets of the multiple CSIs may be set to be equal. CSI reporting periods which are set to be equal may be selected from, for example, a period of a UL HARQ process, an integer multiple of the UL HARQ process period, and a divisor of the UL HARQ process period.

Since a PUSCH operates with a synchronization HARQ process, the UL HARQ process is performed by using UL subframes having a specific period. Therefore, if multi-CSI transmission is adjusted to a specific UL HARQ process period, there is an advantage in that the UL subframe can also be used in multi-CSI transmission other than the UL HARQ process.

Now, methods applicable to a case where a PUSCH for transmitting a CSI is a PUSCH without a UL grant will be described.

1) A DL CC which is a target of a CSI in CSI reporting through a PUSCH without a UL grant may be limited to at least one predetermined DL CC. That is, the maximum number of DL CCs which are targets of the CSI may be determined. In particular, such a restriction may be applied when a periodic CSI is piggybacked through a PUSCH. A DL CC which is a target of a CSI in CSI reporting through a PUSCH without a UL grant may be limited to a DL CC designated through RRC/MAC/PDCCH. In this case, the designated DL CC may differ from a DL CC which is a target of a CSI transmitted through a PUSCCH with a UL grant.

2) A maximum amount of payload that can be transmitted in the CSI reporting through the PUSCH without the UL grant may be predetermined. In this case, a maximum payload may be determined according to a CSI reporting type. For example, the maximum payload amount may be predetermined in such a manner that up to 11 bits of CQI, up to 2 bits of RI, and up to 1 bit of PTI are transmitted. The CSI reporting through the PUSCH without the UL grant may be transmitted only up to a payload designated through the RRC/MAC/PDCCH.

If the UE performs the CSI reporting according to the maximum payload, transmission may be performed by including important information such as an RI series (types 3, 5, and 6, that is, RI/PTI/W1, etc).

In addition, a CSI information amount may differ according to whether ACK/NACK is multiplexed as well as the CSI. For example, in the presence of the ACK/NACK, the number of DL CCs which are targets of the CSI may become smaller, and the maximum payload amount may differ according to an ACK/NACK payload amount and also according to whether an ACK/NACK resource indicator (ARI) is received.

As described above, if an upper limit of a payload is given in CSI reporting through a PUSCH without a UL grant, there may be a disadvantage in that a CSI for some DL CCs is dropped and thus only a part of CSI information is transmitted, whereas there is an advantage in that available resources are utilized to the maximum extent possible.

3) CSI reporting through a PUSCH without a UL grant may be transmitted according to CSI information transmitted through a latest PUSCH with a UL grant in the same HARQ process. That is, the CSI reporting is performed through the PUSCH without the UL grant by determining the upper limit to the number of DL CCs or the CSI payload applied when the CSI reporting is performed through the latest PUSCH with the UL grant in the same HARQ process.

4) The CSI reporting through the PUSCH without the UL grant may be transmitted according to CSI information which is transmitted through an initial PUSCH with a UL grant in the same HARQ process. That is, the CSI reporting is performed through the PUSCH without the UL grant by determining the upper limit to the number of DL CCs or the CSI payload applied when the CSI reporting is performed through the initial PUSCH with the UL grant in the same HARQ process.

5) When CSI reporting is performed through a PUSCH by using SPS among PUSCHs with a UL grant, a CSI is reported according to CSI information of a PUSCH at a time of applying latest activation (or reactivation).

According to the conventional technique, the number of targets DL CCs of a CSI, a CSI payload amount, etc., transmitted through a PUSCH without a UL grant may differ from the number of target DL CCs of a CSI, a CSI payload amount, etc., transmitted through a PUSCH with a UL grant. On the other hand, in the aforementioned methods 3) to 5), when a CSI is reported through a PUSCH without a UL grant, the number of DL CCs or a CSI payload used when the CSI is reported through a PUSCH with a UL grant is applied as an upper limit.

When CSI reporting is performed through the PUSCH with the UL grant, the BS is expected to perform scheduling by using the UL grant in consideration of both data and the CSI. Therefore, CSI reporting through a PUSCH without a UL grant and CSI reporting through a PUSCH with a UL grant use the same number of resource blocks and the same MCS (e.g., PUSCH retransmission is performed after receiving SPS and NACK), the number of DL CCs or the CSI payload is preferably applied equally to the CSI reporting through the PUSCH with the UL grant.

When the number of DL CCs is limited in the aforementioned methods 3) to 5), available resources may not be utilized to the maximum extent possible. Advantageously, however, when target DL CCs of a CSI are determined, CSIs for the determined DL CCs can be all transmitted.

In case of periodic CSI transmission through a PUSCH with a UL grant, CSI information is adaptively transmitted according to the number of resource blocks, an MCS, and a transmission block size. That is, a specific number of DL CCs for which the CSI will be transmitted or a specific method of determining a size of a CSI payload is adaptively determined. For example, when a great number of resource blocks are allocated, a higher-order modulation scheme may be applied. In addition, if the transmission block size is small, since a code rate of data is small, even if some resources are used for the CSI, it may have a little effect on data transmission. Therefore, a CSI may be transmitted in a greater amount in this case.

In addition, a method in which the number of DL CCs which are targets of a periodic CSI and a CSI payload amount are limited by using RRC/MAC/PDCCH may also be applied to periodic CSI transmission through the PUSCH with the UL grant.

Alternatively, a single CSI for one cell selected according to a priority among CSIs for a plurality of cells may be transmitted unconditionally, and other additional CSIs may be selectively transmitted by a UE. The additional CSI may be coded separately, and may be transmitted after puncturing a last part of data. According to such a method, a BS can perform blind decoding. That is, the blind decoding is performed since the BS does not know in advance whether only a single CSI for a specific cell will be transmitted by the UE or a CSI for a different cell is also transmitted together.

In the aforementioned methods, RI series (i.e., types 3, 5, 6) may be transmitted exceptionally for all activated DL CCs in which a CSI transmission period overlaps in a corresponding transmission time or all activated DL CCs belonging to a DL CC group.

In addition, if the PUSCH without the UL grant exists in a specific UL subframe of a primary cell and if the PUSCH with the UL grant exists in the specific UL subframe of a secondary cell, only a CSI which is not transmitted in the primary cell or all CSIs in which transmission periods overlap may be transmitted through the PUSCH with the UL grant.

In order to transmit a CSI for a DL CC group which is a target of multi-CSI transmission, a periodic PUSCH resource may be allocated by using an RRC message or an SPS. That is, if a plurality of DL CC groups are present, a periodic PUSCH per DL CC group and an SPS PUSCH may be allocated independently to transmit a CSI for each of the plurality of DL CC groups. The PUSCHs may be allocated to different cells, or may be allocated to the same cell (e.g., a primary cell).

If a PUSCH for transmitting a CSI for a plurality of a DL CC groups by using RRC/SPS is allocated to a different cell, simultaneous transmission is performed at the occurrence of a CSI collision. On the other hand, if the PUSCH for transmitting the CSI for the plurality of the DL CC groups by using the RRC/SPS is allocated to the same cell, a collision may occur in the same subframe when CSI transmission of different DL CC groups is performed. In this case, only one group is selected according to a priority and the remaining groups are dropped.

If the PUSCH for transmitting the CSI for the plurality of the DL CC groups by using the RRC/SPS is allocated to the same cell, triggering may be performed simultaneously by using one SPS activation PDCCH. When the triggering is performed, a method may be used in which a CSI transmission subframe period, offset, etc., is configured differently for each DL CC group configured by using an RRC in advance while using the same resource block allocation for each PUSCH.

The BS may indicate a DL CC group to be activated/released through a PDCCH for SPS activation/release, and may indicate an activation/release for a plurality of DL CC groups. In this case, the PDCCH for the SPS activation/release may use an SPS-c-RNTI for a CSI for each DL CC group or for each DL CC group combination. Alternatively, a specific bit field required for PDCCH authentication for the SPS activation/release may be used and indicated.

Meanwhile, if PUSCHs for transmitting CSIs for a plurality of DL CC groups by using RRC/SPS or the like are allocated to the same cell and thus a CSI transmission collision occurs for the same cell, a resource of the PUSCH may be adaptively increased. CSIs for all DL CC groups may be simultaneously transmitted by using the increased PUSCH resource.

Figure 10:
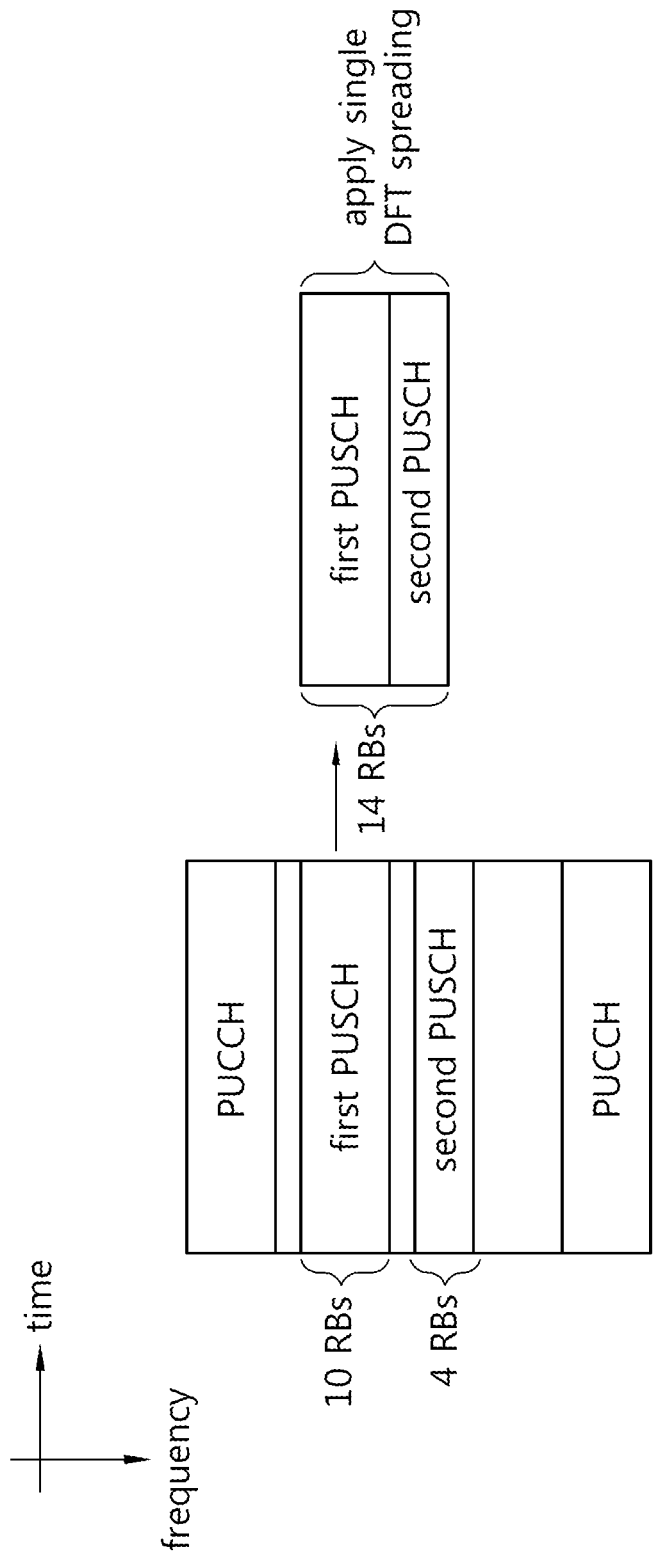
FIG. 10 shows an example of increasing a physical uplink shared channel (PUSCH) resource if PUSCHs for transmitting CSIs for a plurality of DL component carrier (CC) groups by using radio resource control (RRC)/semi-persistent scheduling (SPS) or the like are allocated to the same cell, and a CSI transmission collision occurs for the same cell.

FIG. 10 shows an example of increasing a PUSCH resource if PUSCHs for transmitting CSIs for a plurality of DL CC groups by using RRC/SPS or the like are allocated to the same cell, and a CSI transmission collision occurs for the same cell.

Referring to FIG. 10, a first PUSCH (i.e., 10 resource blocks) may be allocated by using RRC/SPS or the like to transmit a periodic CSI for a DL CC group 1, and a second PUSCH (i.e., 4 resource blocks) may be allocated by using RRC/SPS or the like to transmit a periodic CSI for a DL CC group 2. The first PUSCH and the second PUSCH may be allocated to the same cell. In this case, as illustrated in FIG. 10, when the first PUSCH and the second PUSCH collide in the same UL subframe, a UE may apply single DFT spreading to resource blocks constituting the first PUSCH and the second PUSCH. That is, an RRC/SPS PUSCH resource block (RB) resource allocated independently for each DL CC group may not be used as an independently PUSCH, but may be transmitted in combination similarly to one PUSCH.

In general, it is assumed that a first PUSCH resource allocated for periodic CSI transmission for a first DL CC group is denoted by M in a resource block N, and a second PUSCH resource allocated for periodic CSI transmission for a second DL CC group is denoted by K in a resource block L. If each of two PUSCHs is used as an independent PUSCH, discrete Fourier transform (DFT) spreading is applied to the first PUSCH resource, and the DFT spreading is applied separately to the second PUSCH resource. On the other hand, if the PUSCH resource is increased adaptively, it means that one DFT spreading is applied for all PUSCH resources obtained by adding the first PUSCH resource and the second PUSCH resource.

If a first PUSCH resource block and a second PUSCH resource block overlap or are contiguous, they are used as one contiguous PUSCH. If the first PUSCH resource block and the second PUSCH resource block do not overlap and are divided into non-contiguous clusters, a clustered DFT-S-OFDM method may be applied in which one DFT spreading is applied to all resource blocks obtained by adding the first PUSCH resource block and the second PUSCH resource block and thereafter the resource blocks are mapped to respective resource block clusters. This method may effectively use an amplifier since a peak-to-average power ratio (PAPR) property is improved.

A CSI for each DL CC group may be transmitted in such a manner that it is subjected to separate coding and is mapped to a resource block for transmitting a CSI for each DL CC group before DFT or it is subjected to joint coding and is mapped to all resource blocks.

If only one SPS activation PDCCH is received for a DL CC group combination having a different CSI transmission period, the number of resource blocks for a case where the CSI transmission period collides and the number of resource blocks for a case where a CSI of each DL CC group is transmitted alone may be reported, or a UE may be allowed to calculate the number of resource blocks adaptively according to the number of DL CCs in a DL CC group.

Meanwhile, if CSI transmission through an SPS PUSCH is activated/released, CSI information of an aperiodic CSI request mode may be transmitted.

If a CSI content of a periodic PUCCH CSI mode is transmitted through the SPS PUSCH, this may be triggered by a CSI request field of the SPS activation PUCCH, and a target DL CC of the CSI may use the same value as a DL CC set for an aperiodic CSI mapped to 2 bits (4 types of states can be indicated) of the CSI request field. That is, the existing RRC message may be re-utilized without additional RRC signaling.

Figure 11:
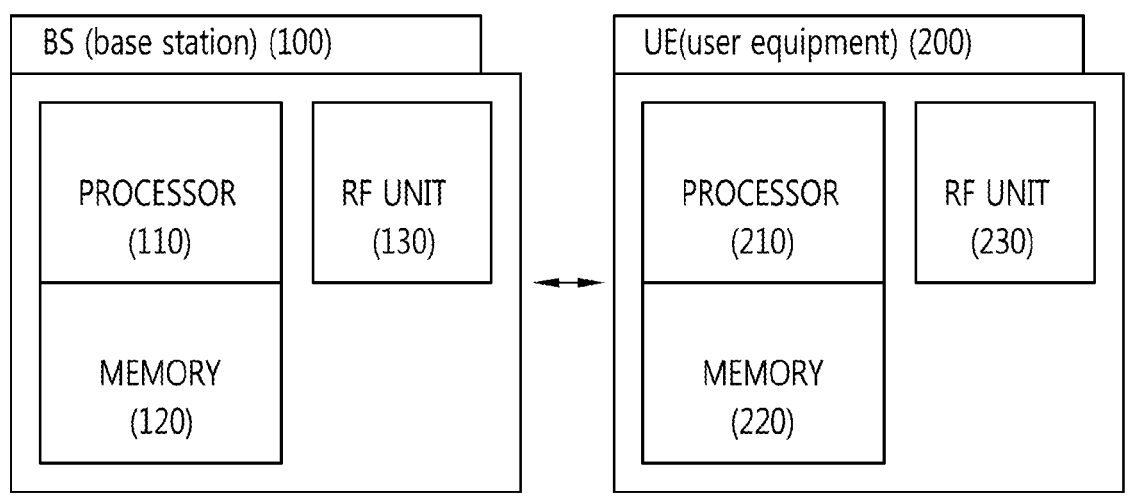
FIG. 11 shows a structure of a base station and a user equipment according to an embodiment of the present invention.

FIG. 11 shows a structure of a BS and a UE according to an embodiment of the present invention.

A BS 100 includes a processor 110, a memory 120, and a radio frequency (RF) unit 130. The processor 110 implements the proposed functions, procedures, and/or methods. For example, the memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method of transmitting channel state information (CSI) of a user equipment to which a plurality of serving cells are allocated in a wireless communication system, the method comprising:
   receiving configuration information for configuring groups including at least one serving cell from the plurality of serving cells, and
   transmitting a periodic CSI for a group selected according to a priority between the groups, when a periodic CSI for each of the groups is configured to be transmitted in a same subframe,
   wherein a periodic CSI for each of at least two serving cells is transmitted together when the at least two serving cells are included in the selected group.

2. The method of claim 1, wherein the configuration information is included in a radio resource control (RRC) message.

3. The method of claim 1, wherein if it is configured such that, among the groups, a periodic CSI for a first group including only one serving cell and a periodic CSI for a second group including two or more serving cells are transmitted in the same subframe, only the periodic CSI for the second group is transmitted.

4. The method of claim 1, wherein if two or more serving cells are included in the selected group, a transmission period of the periodic CSI is equally set for all of the two or more serving cells.

5. The method of claim 4, wherein the transmission period of the periodic CSI is selected from a hybrid automatic repeat request (HARQ) process period, a multiple of the HARQ process period, and a divisor of the HARQ process period.

6. The method of claim 1, wherein the periodic CSI for the selected group is transmitted together with uplink data in a PUSCH of the same subframe.

7. A method of transmitting channel state information (CSI) of a user equipment to which a plurality of serving cells are allocated in a wireless communication system, the method comprising:
   generating a CSI for at least one serving cell among the plurality of serving cells; and
   transmitting the generated CSI through a physical uplink shared channel (PUSCH) which is an uplink data channel,
   wherein if the PUSCH does not have an uplink grant which is corresponding uplink scheduling information and is transmitted by using a resource predetermined by a higher layer signal, the CSI transmitted through the PUSCH is transmitted within a range of a predetermined upper limit.

8. The method of claim 7, wherein the CSI transmitted through the PUSCH is transmitted within a range of a predetermined payload.

9. The method of claim 7, wherein the CSI transmitted through the PUSCH includes only a periodic CSI for a predetermined number of serving cells.

10. The method of claim 7, wherein the CSI transmitted through the PUSCH is a plurality of periodic CSIs for a plurality of serving cells.

11. A user equipment comprising:
   a radio frequency (RF) unit for transmitting and receiving a radio signal; and
   a processor operatively coupled to the RF unit,
   wherein the processor is configured for:
   receiving configuration information for configuring groups including at least one serving cell from a plurality of serving cells; and
   transmitting a periodic channel state information (CSI) for a group selected according to a priority between the groups, when a periodic CSI for each of the groups is configured to be transmitted in a same subframe,
   wherein a periodic CSI for each of at least two serving cells is transmitted together when the at least two serving cells are included in the selected group.

12. A user equipment comprising:
   a radio frequency (RF) unit for transmitting and receiving a radio signal; and
   a processor operatively coupled to the RF unit,
   wherein the processor generates channel state information (CSI) for at least one serving cell among a plurality of serving cells, and transmits the generated CSI through a physical uplink shared channel (PUSCH) which is an uplink data channel, wherein if the PUSCH does not have an uplink grant which is corresponding uplink scheduling information and is transmitted by using a resource predetermined by a higher layer signal, the CSI transmitted through the PUSCH is transmitted within a range of a predetermined upper limit.

* * * * *